United States Patent
Müller et al.

(10) Patent No.: US 11,965,370 B2
(45) Date of Patent: Apr. 23, 2024

(54) DRIVER ELEMENT FOR A MOTOR VEHICLE WINDOW LIFTER

(71) Applicant: Brose Fahrzeugteile SE & Co. Kommanditgesellschaft, Bamberg, Bamberg (DE)

(72) Inventors: Jörg Müller, Bamberg (DE); Michael Trautmann, Neudrossenfeld (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 0 days.

(21) Appl. No.: 17/040,130

(22) PCT Filed: Mar. 18, 2019

(86) PCT No.: PCT/EP2019/056647
§ 371 (c)(1),
(2) Date: Sep. 22, 2020

(87) PCT Pub. No.: WO2019/179908
PCT Pub. Date: Sep. 26, 2019

(65) Prior Publication Data
US 2021/0054671 A1    Feb. 25, 2021

(30) Foreign Application Priority Data
Mar. 22, 2018   (DE) .................... 10 2018 204 432.5

(51) Int. Cl.
| | | |
|---|---|---|
| *B60J 1/17* | (2006.01) | |
| *B60J 1/00* | (2006.01) | |
| *E05F 11/38* | (2006.01) | |
| *E05F 15/697* | (2015.01) | |

(52) U.S. Cl.
CPC ............. *E05F 11/385* (2013.01); *B60J 1/004* (2013.01); *E05F 15/697* (2015.01); *E05Y 2201/434* (2013.01); *E05Y 2201/642* (2013.01); *E05Y 2201/654* (2013.01); *E05Y 2600/46* (2013.01); *E05Y 2600/524* (2013.01); *E05Y 2900/55* (2013.01)

(58) Field of Classification Search
CPC ... B60J 1/004; E05F 15/697; E05F 2011/387; E05Y 2201/434; E05Y 2201/642; E05Y 2201/654; E05Y 2600/46; E05Y 2600/524; E05Y 2900/55; E05Y 2800/344; E05Y 2800/35
USPC ..................................... 49/374, 375
See application file for complete search history.

(56) References Cited

U.S. PATENT DOCUMENTS

| | | | | |
|---|---|---|---|---|
| 4,657,523 A | * | 4/1987 | Chevance | ............. E05F 11/485 49/352 |
| 4,863,417 A | * | 9/1989 | Kimata | ..................... F16H 7/08 474/111 |
| 4,941,286 A | * | 7/1990 | Marscholl | ................. F16C 1/22 49/352 |

(Continued)

FOREIGN PATENT DOCUMENTS

| | | |
|---|---|---|
| CN | 202718517 U | 2/2013 |
| CN | 105683476 A | 6/2016 |

(Continued)

*Primary Examiner* — Jerry E Redman
(74) *Attorney, Agent, or Firm* — Dickinson Wright PLLC

(57) ABSTRACT

A driver element for a motor vehicle window lifter, which element can be connected to a window pane to be moved.

14 Claims, 10 Drawing Sheets

(56) References Cited

U.S. PATENT DOCUMENTS

| | | | | |
|---|---|---|---|---|
| 4,984,386 | A * | 1/1991 | Marscholl | F16C 1/22 49/352 |
| 7,866,229 | B2 * | 1/2011 | Casalini | F16C 1/226 74/501.5 R |
| 7,908,795 | B2 * | 3/2011 | Arimoto | E05F 11/483 49/374 |
| 8,146,293 | B2 * | 4/2012 | Brownlie, Jr. | E05F 11/385 49/375 |
| 8,739,467 | B2 * | 6/2014 | Reno | E05F 11/385 49/374 |
| 8,881,457 | B2 * | 11/2014 | Matsushita | E05F 11/382 49/352 |
| 8,966,820 | B2 * | 3/2015 | Broadhead | E05F 11/483 49/374 |
| 9,822,571 | B2 * | 11/2017 | Reinke | E06B 3/5445 |
| 10,030,430 | B2 * | 7/2018 | Muramatsu | E05D 15/165 |
| 10,041,284 | B2 * | 8/2018 | Yamamoto | E05F 11/486 |
| 10,246,926 | B2 * | 4/2019 | Lagenstroeer | B60J 1/004 |
| 10,287,811 | B1 * | 5/2019 | Arimoto | E05D 15/165 |
| 10,329,825 | B2 * | 6/2019 | Koike | B60J 1/17 |
| 10,604,981 | B2 * | 3/2020 | Shiroma | E05F 11/486 |
| 11,028,629 | B2 * | 6/2021 | Hong | E05F 5/003 |
| 11,078,710 | B2 * | 8/2021 | Kajimoto | E05F 15/689 |
| 11,118,390 | B2 * | 9/2021 | Mueller | E05F 11/483 |
| 11,168,501 | B2 * | 11/2021 | Pavlovic | E05D 15/165 |
| 2005/0198904 | A1 * | 9/2005 | Browne | B60J 10/50 49/374 |
| 2006/0130407 | A1 * | 6/2006 | Castellon | E05F 11/385 49/375 |
| 2007/0006533 | A1 * | 1/2007 | Dedrich | E05F 11/385 49/375 |
| 2007/0180773 | A1 * | 8/2007 | Fortin | E05F 15/689 49/352 |
| 2008/0005971 | A1 * | 1/2008 | Dickie | E05F 15/689 49/349 |
| 2008/0236049 | A1 * | 10/2008 | Arimoto | E05F 11/483 49/352 |
| 2008/0244981 | A1 * | 10/2008 | Arimoto | E05F 11/385 49/352 |
| 2010/0313481 | A1 * | 12/2010 | Brownlie, Jr. | E05F 11/385 49/372 |
| 2011/0067311 | A1 * | 3/2011 | Corden | E05F 11/382 184/14 |
| 2011/0068609 | A1 * | 3/2011 | Saito | E05F 11/385 296/146.2 |
| 2013/0152476 | A1 * | 6/2013 | Reno | E05F 11/385 16/96 R |
| 2013/0255411 | A1 * | 10/2013 | McCorkell | E05F 15/689 74/89.22 |
| 2016/0208535 | A1 * | 7/2016 | Tanaka | B60J 1/004 |
| 2017/0241181 | A1 | 8/2017 | Reinke et al. | |
| 2018/0326820 | A1 * | 11/2018 | Huang | E05F 11/385 |
| 2021/0054671 | A1 * | 2/2021 | Müller | B60J 1/004 |
| 2022/0025687 | A1 * | 1/2022 | Shiroma | E05D 15/165 |

FOREIGN PATENT DOCUMENTS

| | | |
|---|---|---|
| CN | 206693823 U | 12/2017 |
| CN | 107636244 A | 1/2018 |
| CN | 206844922 U | 1/2018 |
| DE | 20202551 U1 | 6/2002 |
| DE | 102009047857 A1 | 5/2010 |
| DE | 102010023460 A1 | 1/2011 |
| DE | 102010013945 A1 | 10/2011 |
| DE | 102012223825 A1 | 7/2013 |
| DE | 102014205548 A1 | 10/2015 |
| DE | 102015212355 A1 | 1/2017 |
| DE | 202016102999 U1 | 9/2017 |
| EP | 0208237 A1 | 1/1987 |
| EP | 0643187 B1 | 2/1997 |
| JP | 2005307529 A | 11/2005 |
| JP | 2007162299 A | 6/2007 |

* cited by examiner

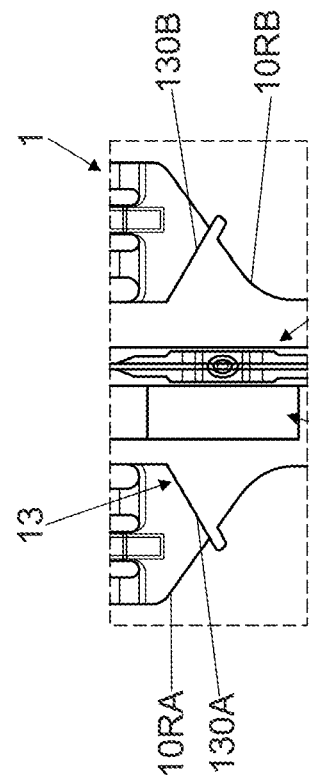
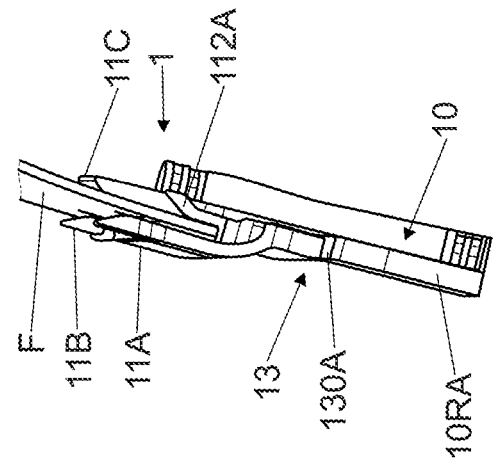
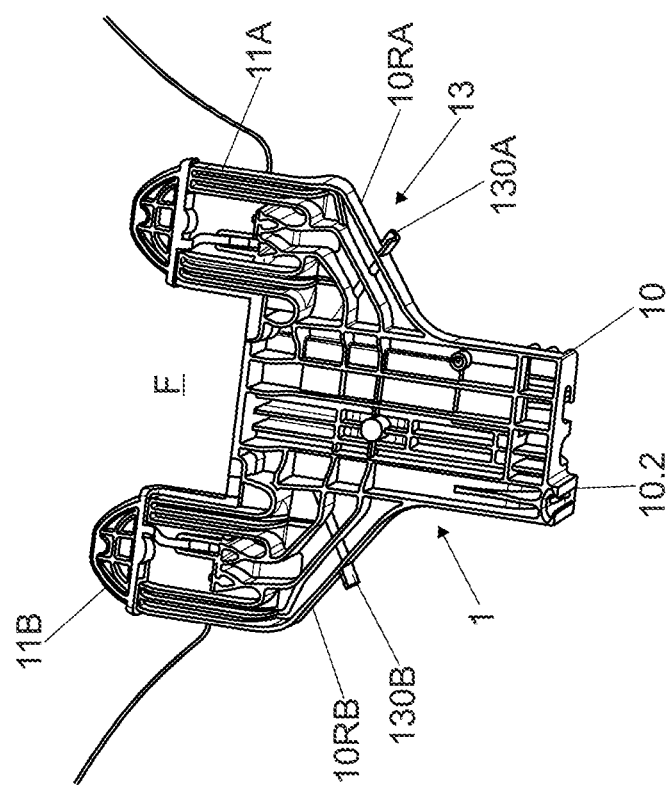

DRIVER ELEMENT FOR A MOTOR VEHICLE WINDOW LIFTER

CROSS-REFERENCE TO RELATED APPLICATIONS

This application is the U.S. National Phase of PCT Application No. PCT/EP2019/056647 filed on Mar. 18, 2019, which claims priority to German Patent Application No. DE 10 2018 204 432.5, filed on Mar. 22, 2018, the disclosures of which are hereby incorporated in their entirety by reference herein.

TECHNICAL FIELD

The present disclosure relates to a driver element for a motor vehicle window lifter, which element can be connected to an adjustable window pane.

BACKGROUND

Driver elements for a motor vehicle window lifter are widely known in many different designs. Generally such driver elements are displaceably guided on guide rails and connected to the window pane in the region of a lower edge of a window pane. Generally a flexible traction means, for example in the form of a cable pull, acts on the driver element in order to transmit a adjustment force to the driver element for moving the window pane via the flexible traction means. The driver element may then be displaced along the guide rail in order to lift or lower the window pane.

In driver elements known from practice, in particular in a driver element for motor vehicle window lifters, there is generally a need for improvement relative to different mounting and/or installation situations. For example, there is generally a need for structural improvements to a driver element, in order to improve the mounting of the window pane on the driver element, the attachment of the window pane to the driver element, the connection of a flexible traction means to the driver element and/or the durability of the driver element and a window lifter assembly formed thereby.

SUMMARY

According to one or more embodiments, a driver element is provided. The driver element may include a driver element body and a pane connecting region provided on the driver element body, via which the driver element is able to be secured to the adjustable window pane. This pane connecting region defines a connecting gap into which the window pane to be connected may be inserted with a lower edge, so that in the intended connected state the lower edge opposes a base of the pane connecting region. Relative to an improved mounting of the window pane on the driver element as well as an improved attachment of the window pane to the driver element, it is further proposed that the pane connecting region also has the following:
- at least one connecting bar which is provided on the driver element body, a latching lug being provided thereon for positive engagement in a connecting opening provided on the window pane, and which is opposed by at least one positioning section protruding from the base, wherein for mounting the window pane on the driver element in a mounting direction, the connecting bar is elastically displaceable on the driver element body and the positioning section opposing the connecting bar forms a guide surface which runs in an inclined manner relative to the mounting direction of the window pane, the lower edge of the window pane inserted into the connecting gap being guided thereby in the direction of the base, and/or
- at least one support section, which is made of an elastic material and which protrudes from the base, for the support of the lower edge of the window pane.

Thus a proposed pane connecting region has a connecting bar with an opposing positioning section forming a guide surface which runs in an inclined manner and, alternatively or additionally, a support section made of an elastic material on the base of the pane connecting region.

Via the positioning section which is provided, the lower edge of the window pane which is already inserted into the connecting gap of the pane connecting region may be conducted in a targeted manner in the direction of the base and thus into a latching position in which the latching lug of the connecting bar snaps into the designated connecting opening of the window pane. In this case, for example, a stabilizing of the window pane which is already inserted into the connecting gap may be achieved perpendicular to the mounting direction by means of the positioning section. Thus the window pane, typically when the motor vehicle window lifter is already premounted with the driver element, is guided from above toward the driver element which is held in a mounting position. The lower edge inserted into the connecting gap in this case initially displaces the elastically displaceable connecting bar transversely to the mounting direction until the window pane has been moved sufficiently far toward the base of the pane connecting region that the latching lug of the connecting bar is able to snap into the connecting opening of the window pane. In this context, it has been shown that in some circumstances the connecting bar is displaced, such as pivoted, to an undesirable extent by the lower edge of the window pane inserted into the connecting gap and thus a latching of the latching lug with the connecting opening of the window pane is not present. An additional stabilizing of the already inserted pane lower edge and an edge of the window pane forming the pane lower edge may be achieved inside the connecting gap via the additional positioning section which opposes the connecting bar.

By the at least one support section, which alternatively or additionally protrudes from the base, and also after mounting the window pane on the driver element as intended, it may be achieved that the window pane on its lower edge is elastically mounted on the driver element. The at least one support section, which is made of an elastic material and which protrudes from the base, if required ensures only a local support of the lower edge of the window pane on the base when the window pane has been connected as intended to the driver element. Thus a window lifter assembly with a driver element and window pane may be provided in which the window pane with its lower edge merely bears against one or more support sections made of an elastic material and protruding from the base. On the other side of the one or more support sections, the window pane does not bear with its lower edge against the base so that on the other side of one or more support sections the lower edge is spaced apart from the base and a narrow gap is present. Thus by an elastically deformable support section a spring path is provided about which the window pane is displaceable relative to the driver element during operation of the window lifter, for example when the window pane is moved into an (upper) end position. For example, via the at least one protruding support section made of an elastic material, at least a slight relative movement is permitted between the window pane and the driver element when the window pane moves into a pane seal for the complete closing of a window opening.

In a variant, when the window pane is moved in an opposing adjustment direction reversal noise is also avoided via the support section on the base of the driver element, the support section protruding in the direction of the pane lower edge. Moreover, a defined support of the pane on the driver element is always provided via the elastic support section, which also ensures a defined support of the (pane) lower edge on the driver element, in the case of slight tilting movements of the window pane when the window pane is lifted.

In a variant, the connecting bar of the pane connecting region is elastically pivotable about a pivot axis, wherein the base of the pane connecting region, on which the positioning section is provided, is spaced apart from this pivot axis. On the driver element, therefore, a spatial offset is provided between the pivot axis of the connecting bar (or a pivot axis of a plurality of connecting bars provided on the driver element) relative to the base which the pane lower edge opposes when the window pane is fixed as intended to the driver element. Such a spacing between the pivot axis of the connecting bar and the base on which, for example, the support sections for the support of the lower edge of the window pane are provided, may permit a larger opening angle, for example, by the elastic displacement of the connecting bar when the window pane is mounted onto the driver element.

In a variant, the positioning section of the pane connecting region may also be elastically displaceable for mounting the window pane on the driver element and for example, relative to the connecting bar. The positioning section serving for stabilizing the pane lower edge, which is already inserted into the connecting gap, therefore, may also have a certain elastic displaceability in order to assist the reaching of the latching position of the window pane on the driver element, in which the latching lug of the connecting bar thus snaps into the connecting opening on the window pane. In this case, when mounting the window pane, for example, the positioning section opposing the connecting bar is pivotable directly opposite the connecting bar and namely by the action of the window pane which is inserted in the mounting direction with the lower edge into the connecting gap. Thus the window pane with its lower edge may initially act on the connecting bar in order to pivot this connecting bar in a first pivoting direction (for example in the direction of an outer face) before, subsequently, when the window pane is inserted further into the connecting gap of the driver element, the lower edge also elastically displaces the positioning section by being guided along the guide surface of the positioning section, which runs in an inclined manner. In this case, the elastic displacement of the positioning section is carried out opposite the pivoting direction of the connecting bar (for example in the direction of an inner face). Thus the positioning section, —optionally together with the base— may be elastically displaceable relative to the connecting bar.

In one or more embodiments, the connecting bar of the pane connecting region is elastically pivotable about a first pivot axis on the driver element body and the positioning section of the pane connecting region is elastically pivotable about a second pivot axis spaced apart from the first pivot axis. In such a variant, therefore, the first and second pivot axes of the connecting bar—optionally running parallel to one another—on the one hand, and of the positioning section, on the other hand, are spatially offset relative to one another in a targeted manner in the mounting direction of the window pane. As a result, a successive elastic pivoting of the connecting bar and the positioning section may be implemented according to the degree of insertion of the pane lower edge into the connecting gap of the driver element, without having to reinforce the pane connecting region as a result of the loads acting in different directions for the pivoting of the connecting bar and the positioning section.

In another embodiment, the connecting bar of the pane connecting region is of U-shaped configuration, wherein a recess in the connecting bar is delimited by two arms and a top section of the U-shaped connecting bar connecting the arms. For example, the latching lug of the connecting bar is configured on the top section so that an elastic displacement of the top section, which is provided with the latching lug, is possible via the two arms.

As an example, with its guide surface running in an inclined manner relative to the mounting direction, the additional profiling section directly opposes the recess configured in the connecting bar (transversely to the mounting direction).

Alternatively or additionally it may be provided that the base, on the support section thereof, optionally on the protruding support section thereof made from an elastic material, against which the lower edge of the window pane is intended to bear, is formed by a socket section of the driver element which protrudes from the driver element body in the direction of the top section of the U-shaped connecting bar. In this case, in particular, the configuration of the base by a socket section may serve for spacing the base apart from a pivot axis of the connecting bar, the connecting bar being elastically displaceable about the pivot axis when mounting the window pane on the driver element. Via the protruding socket section, it is also possible to incorporate an elastic displaceability of the positioning section which is provided on the base and/or the positioning section is designed to be elastically displaceable directly on the base which protrudes in the manner of a socket.

In one or more embodiments, the socket section may at least partially extend in the recess of the connecting bar. This permits not only the compact design of the driver element with the connecting bar and positioning section. Moreover, in one possible development, via the socket section extending at least partially in the recess of the connecting bar, it is also achieved that a bearing finger or bearing projection, which is additionally provided on the base on the sides of the connecting bar, may be present specifically between the two arms of the connecting bar for the inserted window pane. Such a bearing finger or bearing projection, which is provided on the socket section and located between the two arms, may provide an (additional) support transversely to the mounting direction of the window pane onto the driver element, when the window pane is mounted as intended onto the driver element. For example, when the window pane is mounted as intended, a section of the window pane is present specifically between the bearing finger or bearing projection and the positioning section, which both protrude from the base formed by the socket section.

As an example, the positioning section may have different geometries and contours. In a variant, for example, the positioning section is of pin-shaped configuration. Thus in this variant, relative to an intended installed state of the driver element, the extension section may protrude in a pin-shaped manner upwardly from the base.

In one or more embodiments, two opposing sides of the connecting gap of the pane connecting region are defined, in particular, by (on the one hand) the connecting bar and (on the other hand) a bearing section protruding from the driver element body. The at least one connecting bar and the protruding, for example projection-shaped, bearing section thus define the connecting gap into which the lower edge of the window pane may be inserted in order to connect the window pane as intended to the driver element. The positioning section which is configured with its guide surface running in an inclined manner is accordingly additionally provided and is effective only when the lower edge of the window pane is already inserted in the connecting gap in order to guide the lower edge of the window pane ultimately in the direction of the base and thus the latching position, in order to snap in the latching lug.

As an example, two or more connecting bars may also be provided on the driver element. In particular, for a single-strand window lifter, the securing of the window pane is advantageous via two connecting bars, which are provided in each case with a latching lug, which then may be latched into two connecting openings provided on the window pane.

In one or more embodiments, the above-mentioned bearing section is provided specifically between the two connecting bars. Whilst the connecting bars protrude from the driver element body on one side of the window pane, when the window pane is mounted as intended onto the driver element, the bearing section protrudes on the opposing side of the window pane. Accordingly, in this case a section of the window pane on the lower edge of the window pane is received in a connecting gap which is defined, on the one hand, by the two connecting bars and, on the other hand, by the bearing section.

A support section of the pane connecting region protruding from the base may be configured, for example, by a soft component. For example, this soft component is injection-molded onto the base. In this case, the base may consist of a hard component. Whilst the optionally injection-molded soft component, therefore, is elastically compressible, for example, the hard component of the base is relatively stiff. For example, the base is made from a thermoplastic material, such as for example polypropylene or polyamide. The soft component which is injection-molded thereon and which forms the at least one support section, consists, for example, from a thermoplastic elastomer, such as for example thermoplastic copolyester.

In one or more embodiments, the support section is formed by a locally protruding thickening of the soft component on the base. The soft component in this case may be provided, in particular, on a socket section, which at least partially extends in a recess of a U-shaped connecting bar and/or on a base which has a positioning section.

According to another embodiment, a proposed driver element has at least one liquid-guiding element for discharging liquid from the driver element body. The at least one liquid-guiding element in this case may be part of a liquid-guiding structure via which liquid is discharged from the driver element body when this liquid-guiding structure is mounted as intended as a component of a window lifter.

By means of the liquid-guiding element, a structure is provided on the driver element, in particular configured on the driver element body, by means of which liquid is discharged from the driver element in a drainage direction predetermined by the at least one liquid-guiding element. For example, this involves liquid being able to be guided in the direction of an edge of the driver element body via the at least one liquid-guiding element. Via the liquid-guiding element, therefore, during operation of the window lifter, liquid passing onto the driver element may be discharged in a targeted manner and, in particular, conducted away in a targeted manner from sections and/or components of the driver element and/or the window lifter. For example, via the at least one liquid-guiding element it may be ensured that liquid originating from the driver element, for example water, is conducted away from a guide rail displaceably mounting the driver element and/or from a traction means secured to the driver element.

In one or more embodiments, it the at least one liquid-guiding element extends with one end beyond an edge of the driver element body. Via the liquid-guiding element, therefore, liquid present on the driver element body may be conducted away from the driver element body and drain away at the end of the liquid-guiding element extending beyond the edge.

The liquid-guiding element may comprise, for example, a rib, recess and/or channel provided on the driver element body, in particular configured on the driver element body.

According to another embodiment, which is independent of the above-described first and second feature but may be easily combined with the first and/or second feature, a proposed driver element has a traction means connecting region for connecting a flexible traction means to the driver element body, the traction means connecting region having two successive nipple chambers in a longitudinal direction. According to the proposed solution, a mounting opening is provided between these two nipple chambers, in each case an end section of the flexible traction means being able to be inserted thereby into the nipple chambers. Via the end sections inserted into the nipple chambers and positively held therein, after being mounted as intended, a adjustment force for moving the window pane connected to the driver element may be transmitted via the flexible traction means to the driver element. For simplifying the mounting, the mounting opening relative to the longitudinal direction is also provided with a length which corresponds to at least half of the sum of the lengths of the two nipple chambers. In particular, the mounting opening may be provided with a length which, relative to the longitudinal direction, corresponds to at least 0.8 times or to at least the sum of the lengths of the two nipple chambers. In this manner, for example, two end sections of the traction means which are provided in each case with a spring element may be inserted, without compression of the spring elements, via the common mounting opening in succession into the nipple chambers.

Accordingly, for example in another embodiment, the mounting opening of the traction means connecting region may have a length such that two end sections of the traction means which are provided in each case with a spring element may be inserted in succession, without compression of the spring elements, via the one mounting opening into successive nipple chambers in the longitudinal direction. Via the mounting opening of the traction means connecting region, which is dimensioned as proposed, for example in the case of a flexible traction means designed as a cable pull, compression springs provided for cable length compensation with in each case a cable nipple may be inserted in succession through the mounting opening provided between the nipple chambers manually (by hand) without the expenditure of force. A mounting aid for the compression of a compression spring, in order to be able to insert this compression spring as intended into a nipple chamber on the driver element, for example a so-called power pack, is thus not necessary here.

In one or more embodiments, the traction means connecting region has a traction means guide channel, which is open at least on one side, with an elongated traction means opening for inserting a section of the traction means into the traction means guide channel. When mounting the traction means on the driver element, therefore, an end section of the traction means is inserted via the mounting opening into the nipple chamber, wherein a section of the traction means extending away from the end section is inserted via the traction means opening into the traction means guide channel adjoining a nipple chamber.

As an example, a greasing opening is provided between a traction means opening of a traction means guide channel, which is assigned to a nipple chamber, and the mounting opening, a greasing of the nipple chamber being possible thereby from the outside. For example, therefore, the mounting opening, the greasing opening of a nipple chamber and a traction means opening for the traction means guide channel adjoining a nipple chamber follow one another in the longitudinal direction.

In one or more embodiments, for facilitating the greasing via the greasing opening, a width of the greasing opening is larger than a width of the mounting opening but smaller than a width of the traction means opening of the traction means guide channel. By the reduced width of the greasing opening relative to the mounting opening, it is ensured that an end section of the traction means, which is inserted as intended into the nipple chamber and which is optionally spring-loaded, may not be removed from the nipple chamber via the greasing opening. At the same time, via the greater width of the greasing opening relative to the traction means opening of the traction means guide channel, it is ensured that a greasing of the nipple chamber, for example with nepheline, is facilitated.

According one or more embodiments, a pane connecting region may be readily combined with a liquid-guiding element and/or with a traction means connecting region. Thus, for example, a traction means connecting region may be provided on a driver element body of a driver element, on which a pane connecting region is provided at the side and above the traction means connecting region, the pane connecting region having two elastically displaceable connecting bars arranged above and to the side of the pane connecting region, with in each case a latching lug and in each case a positioning section opposing a connecting bar, as well as at least one base comprising an elastic support section. At least one liquid-guiding element may also be configured on the driver element body, in order to conduct liquid from the traction means connecting region in a targeted manner outwardly to an edge of the driver element body and to permit the liquid to drain away. In this case, relative to the mounting direction of the window pane and/or an adjustment axis of the window pane, after the mounting of the window lifter as intended, the liquid-guiding element may extend directly below a connecting bar on the driver element body.

BRIEF DESCRIPTION OF THE DRAWINGS

The accompanying figures illustrate by way of example possible variants of the proposed solution.

In the drawings:

FIGS. 6A-6C show different views of the driver element of FIGS. 1A and 1*i*, illustrating a liquid-guiding structure which is provided on the driver element;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 7:
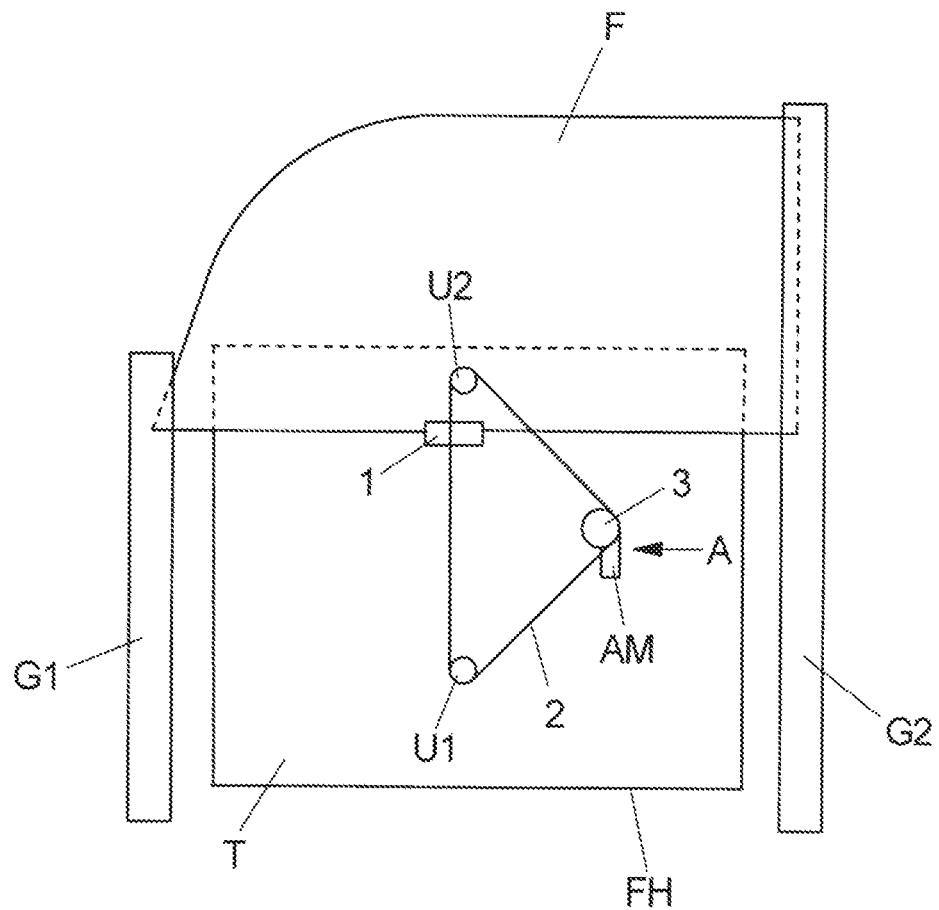
FIG. 7 shows schematically a window lifter assembly in which a proposed driver element is used.

FIG. 7 illustrates by way of example a window lifter for a motor vehicle. This window lifter comprises a window lifter assembly FH with a displaceably guided driver element 1 to which a window pane F is connected. The driver element 1 is coupled to a flexible traction means in the form of a cable pull 2 which is movable via a plurality of deflection elements U1, U2, for example in the form of rotatably mounted cable pulleys, by means of a drive A. The drive A which is arranged on a support component T, as are the deflection elements U1 and U2, drives a cable drum 3 via a motor MA. By winding and unwinding the cable pull 2 respectively on and off the cable drum 3, the driver element 1 may be moved longitudinally. Then the window pane F guided laterally in pane guides G1 and G2 is lifted or lowered thereby depending on the rotational direction of the cable drum 3. In the single-strand window lifter, shown in FIG. 7, the driver element 1 may be displaceably guided along a guide rail which is formed by the support component T or fixed to the support component T.

A variant of the driver element 1 according to the proposed solution is shown in FIGS. 1 to 6C.

The driver element 1 in this case has a driver element body 10 on which, in particular, rail grips 10.1, 10.2 are formed on a guide rail for a displaceable bearing of the driver element 1. These rail grips 10.1, 10.2 are provided in a central region of the driver element body 10 on an inner face 1B of the driver element 1.

On an upper end of the driver element 1, relative to the intended installed state, the driver element body 10 forms a pane connecting region 11 with two elastically displaceable connecting bars 11A and 11B. The connecting bars 11A and 11B protruding upwardly on the driver element body 10, are configured, for example according to FIGS. 1A and 1, in each case in a U-shaped manner. Via two arms of this U-shape, each connecting bar 11A, 11B is elastically displaceable on the driver element body 10 so that a top section 11KA or 11KB connecting the two arms is pivotable when mounting the window pane F onto the driver element 1. A latching lug 110A or 110B is formed on each of these top sections 11KA, 11KB, when the window pane F is attached as intended to the driver element 1, the latching lug snapping into a connecting opening of the window pane F in order to secure the window pane F and the driver element 1 to one another.

Between the two connecting bars 11A and 11B extends a bearing section in the form of a bearing projection 11C. Together with the connecting bars 11A and 11Bn, the central bearing projection 11C defines a connecting gap S on the pane connecting region 11 into which the window pane F (see FIG. 2) may be inserted with a lower edge K in order to secure the window pane F to the driver element 1. When the window pane F is connected as intended, the two connecting bars 11A and 11B are present on one side of the window pane F whilst the bearing projection 11C is present on an opposing side of the window pane F. In the intended installed state, for example, an outer face 1A of the driver element 1 with the connecting bars 11A and 11B faces an outer face of a motor vehicle, whilst the inner face 1B with the bearing projection 11C faces an interior of the motor vehicle.

In the intended assembled state, the lower edge K of the window pane F in each case bears against a base 113A, 113B of the pane connecting region 11 which defines a lower end of the connecting gap S. A base 113A, 113B in this case is provided in each case in the region of one of the connecting bars 11A, 11B and configured on a socket section 114A or 114B which extends into a recess OA or OB formed between the arms of a connecting bar 11A or 11Bn. A base 113A or 113B is spaced apart in each case upwardly via the socket section 114A or 114B from a pivot axis D1 of a connecting bar 11A or 11B about which a connecting bar 11A or 11Bn, during the mounting of the window pane F on the driver element 1, may pivot (outwardly) in a pivoting direction R1, see FIGS. 4A to 4C.

A bearing finger 111A or 111B assigned to the outer face 1A is configured, amongst other things, as part of the pane connecting region 11 on each base 113A or 113B assigned to a connecting bar 11A or 11B. Moreover, a positioning section in the form of an arresting hook 112A or 112B, protruding in the manner of a pin from the base 113A or 113B, is provided opposite each connecting bar 11A or 11B. Each of these arresting hooks 112A, 112B contributes to the stabilizing of the window pane F inserted into the connecting gap S during mounting and via a guide surface 1120A or 1120B guides the (pane) lower edge K in the direction of the base 113A or 113B and thus into an intended latching position, in which the latching lugs 110A and 110B of the connecting bars 11A and 11B are able to snap into the associated connecting openings of the window pane F. A guide surface 1120A, 1120B of an arresting hook 112A or 112B in each case is designed to be inclined relative to a mounting direction M, along which the window pane F may be inserted (from above) into the connecting gap S.

Figure 4A:
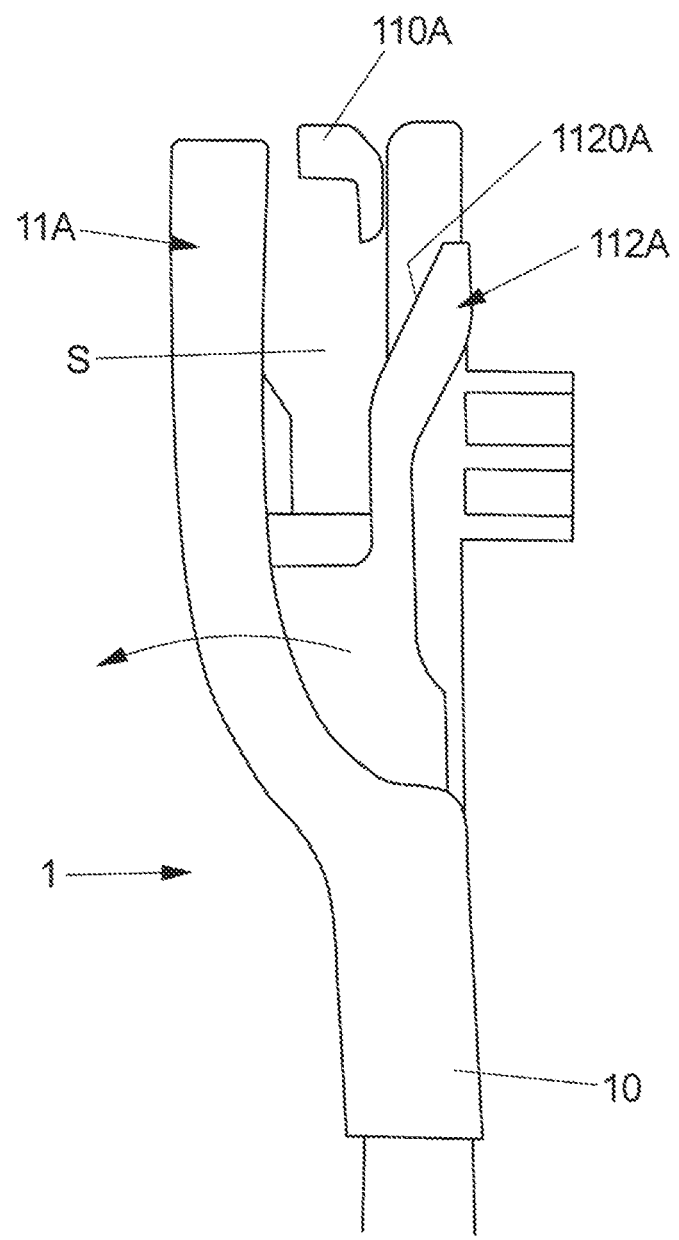
FIGS. 4A-4D show the mounting of the window pane onto the driver element in a view coinciding with FIG. 3 in further phases.
Figure 4B:
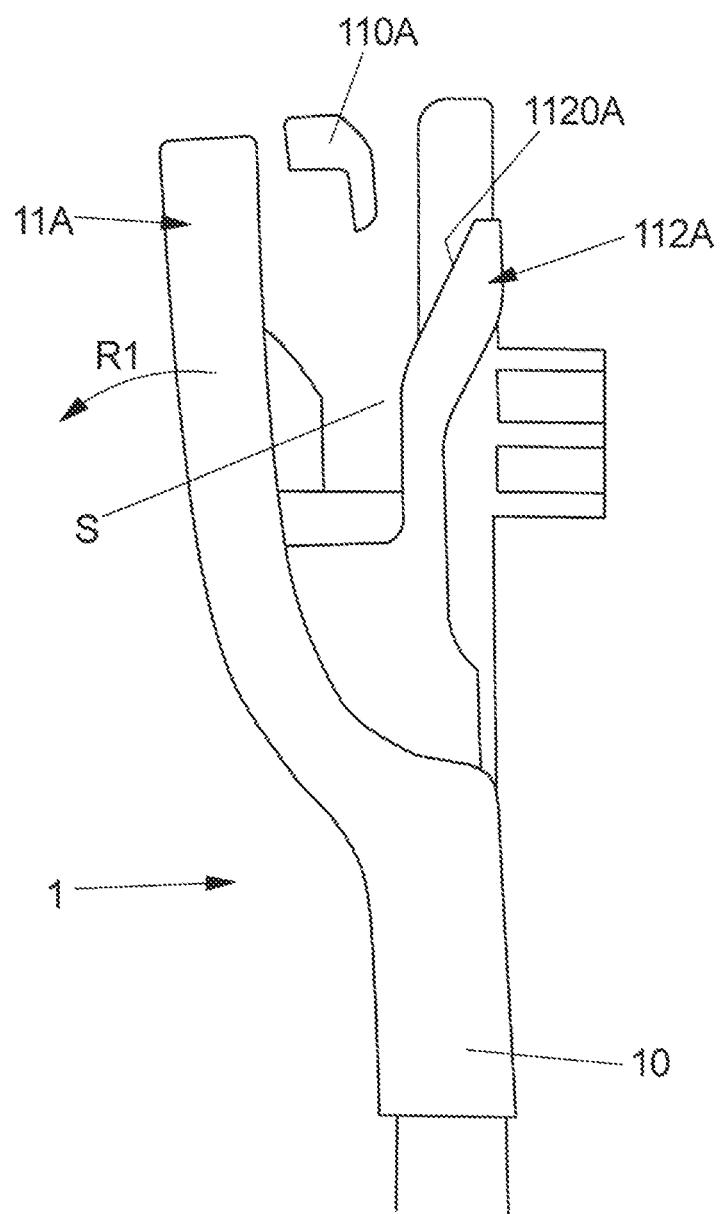
Figure 4C:
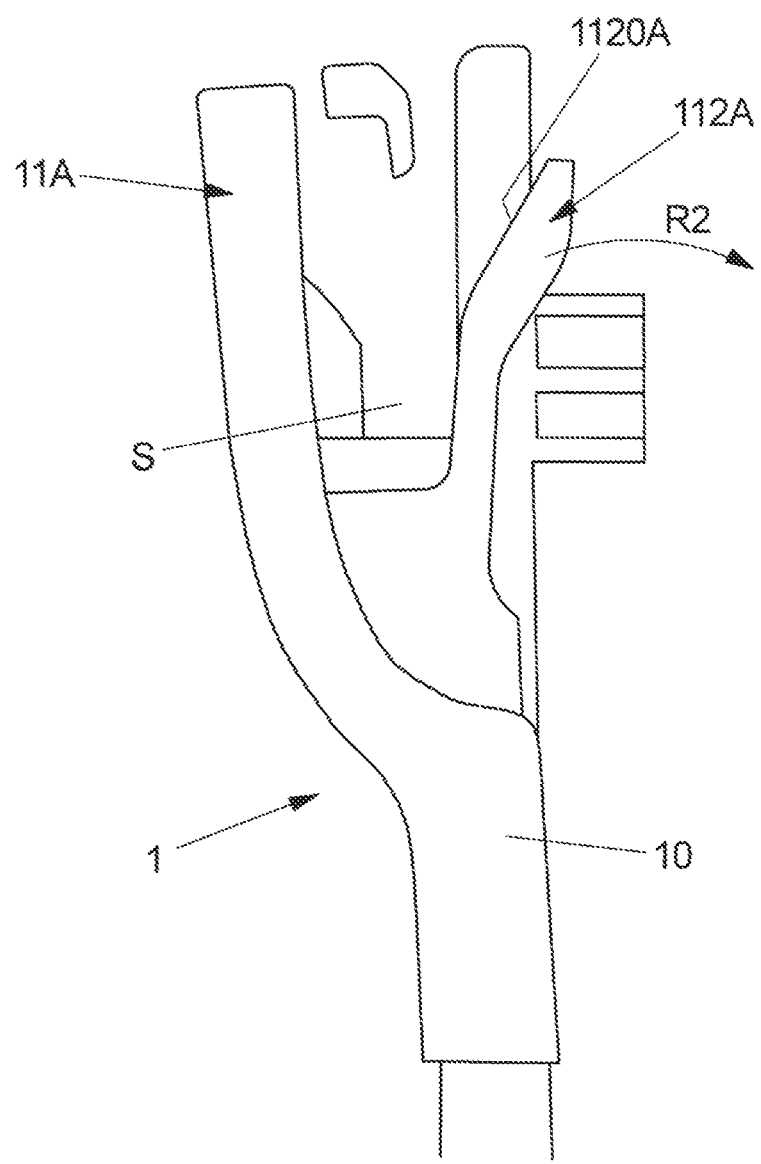
Figure 4D:
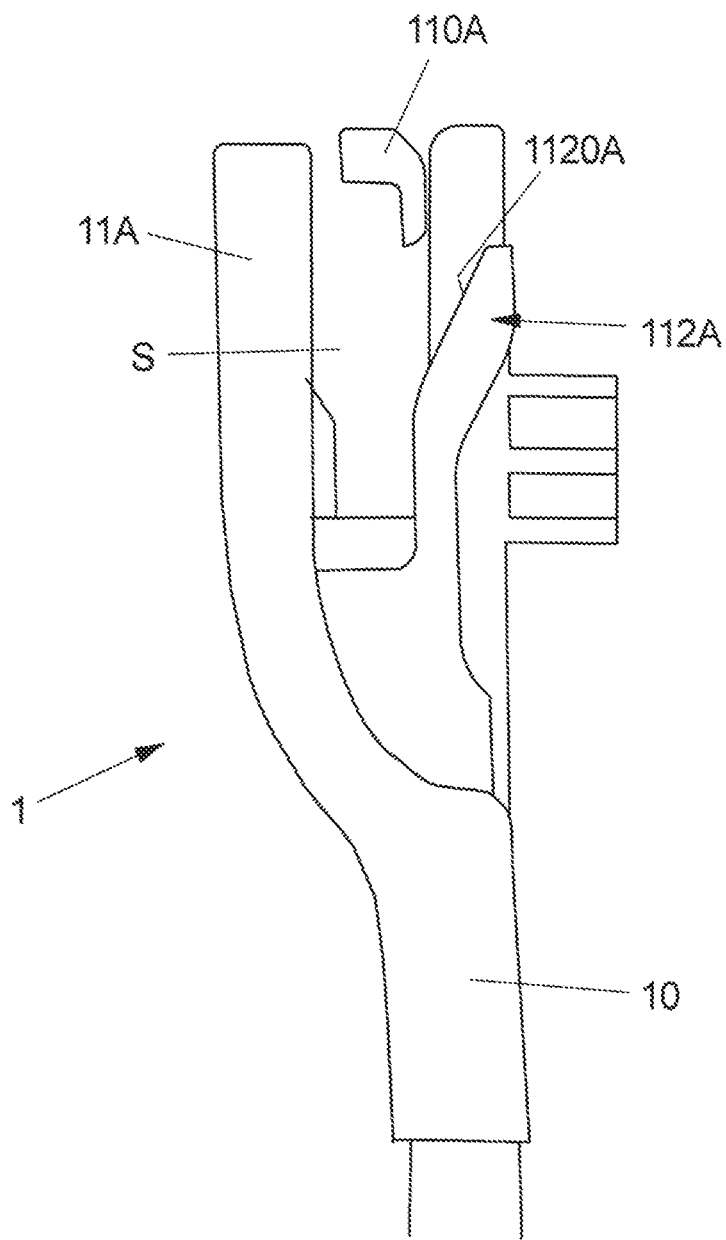

As is shown with reference to FIGS. 3 and 4A to 4D for different phases during the mounting of the window pane F onto the driver element 1, the window pane F inserted in the connecting gap S initially with its lower edge K by running over the latching lugs 110A and 110B displaces the connecting bars 11A and 11B. As a result, the connecting bars 11A and 11B are initially displaced outwardly (FIG. 4A) together with the respective base 113A, 113B relative to the remainder of the driver element body 10 which is already held on a guide rail via the rail grips 10.1, 10.2. Then the connecting bars 11A and 11B pivot elastically about their pivot axis D1 outwardly in the pivoting direction R (FIG. 4B). So that the window pane F, when moved further in the direction of the bases 113A and 113B, does not pivot the connecting bars 11A and 11B further outwardly, and thus potentially a latching with the connecting bars 11A and 11B is not present, the lower edge K of the window pane F when moved further in the mounting direction M runs over the guide surfaces 1120A and 1120B of the arresting hooks 112A and 112B which oppose the connecting bars 11A and 11B (FIG. 4C). Via the guide surfaces 1120A and 1120B, which run in an inclined manner, the lower edge K of the pane F is guided in a defined manner downwardly in the direction of the bases 113A and 113B, down into the designated latching position (FIG. 4D).

Figure 1:
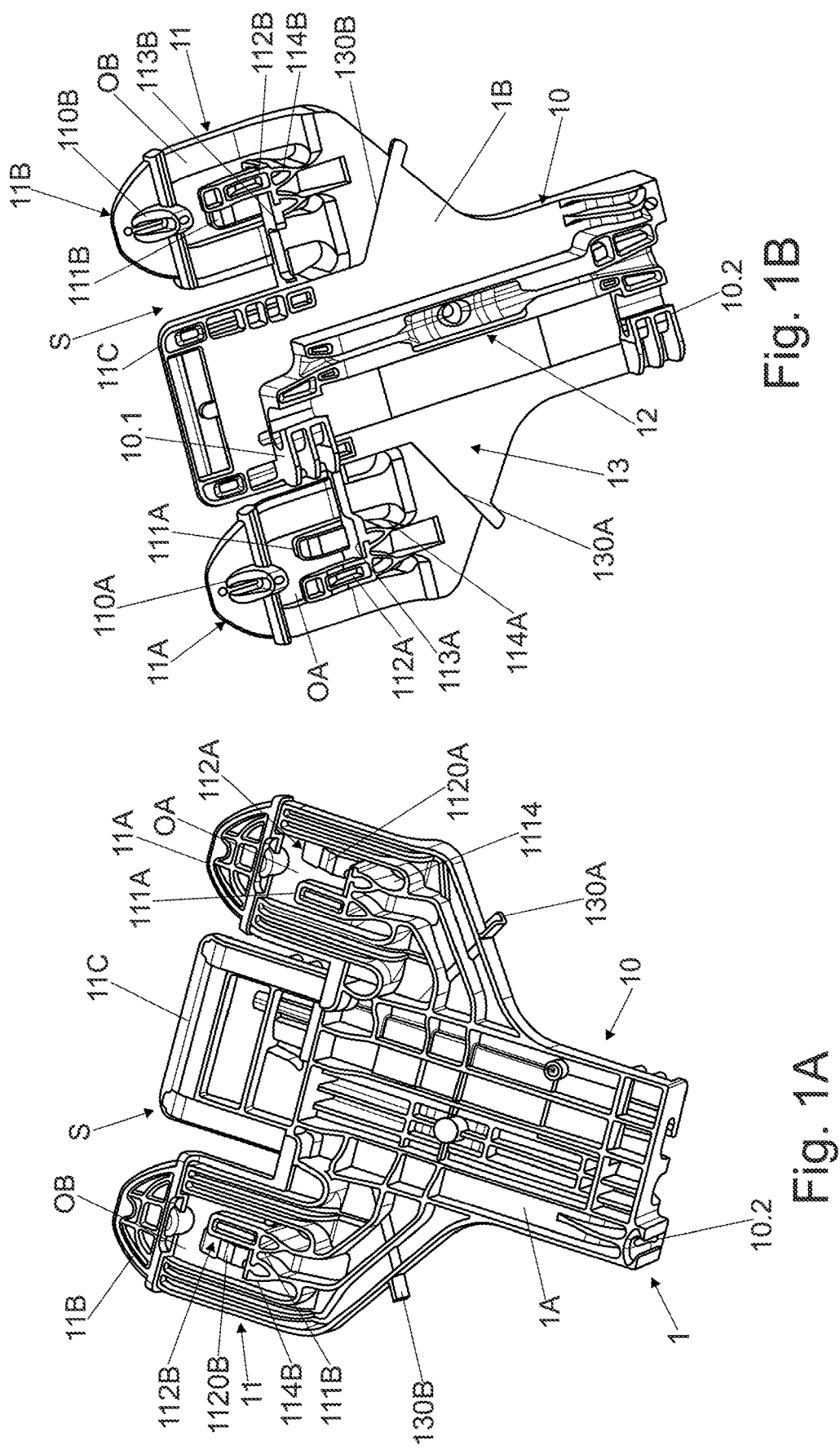
FIGS. 1A-1B in each case show a variant of a proposed driver element in a perspective view and with a view of different sides.
Figure 2:
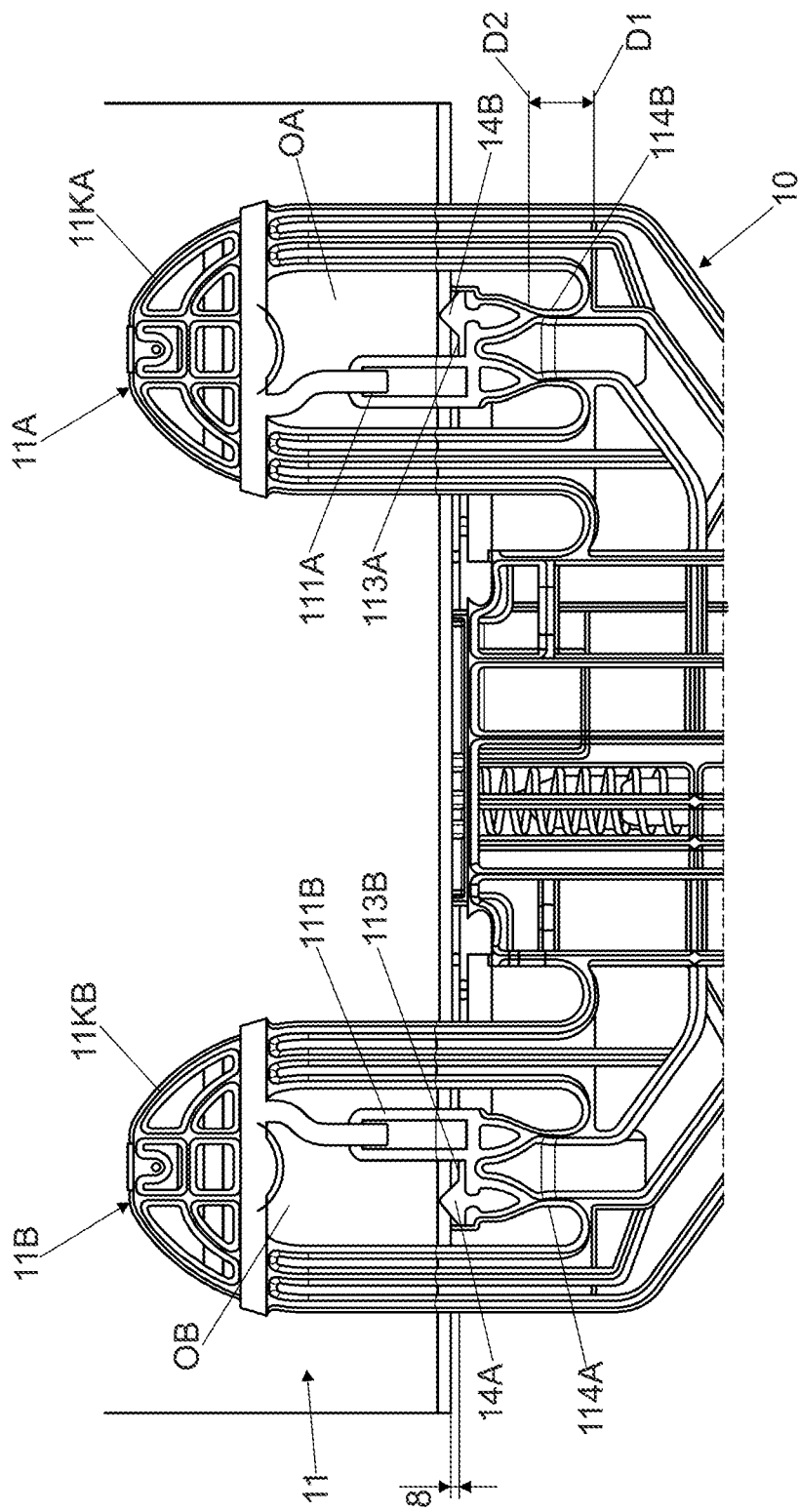
FIG. 2 shows in a side view and in a detail the driver element with a window pane connected to the driver element.
Figure 3:
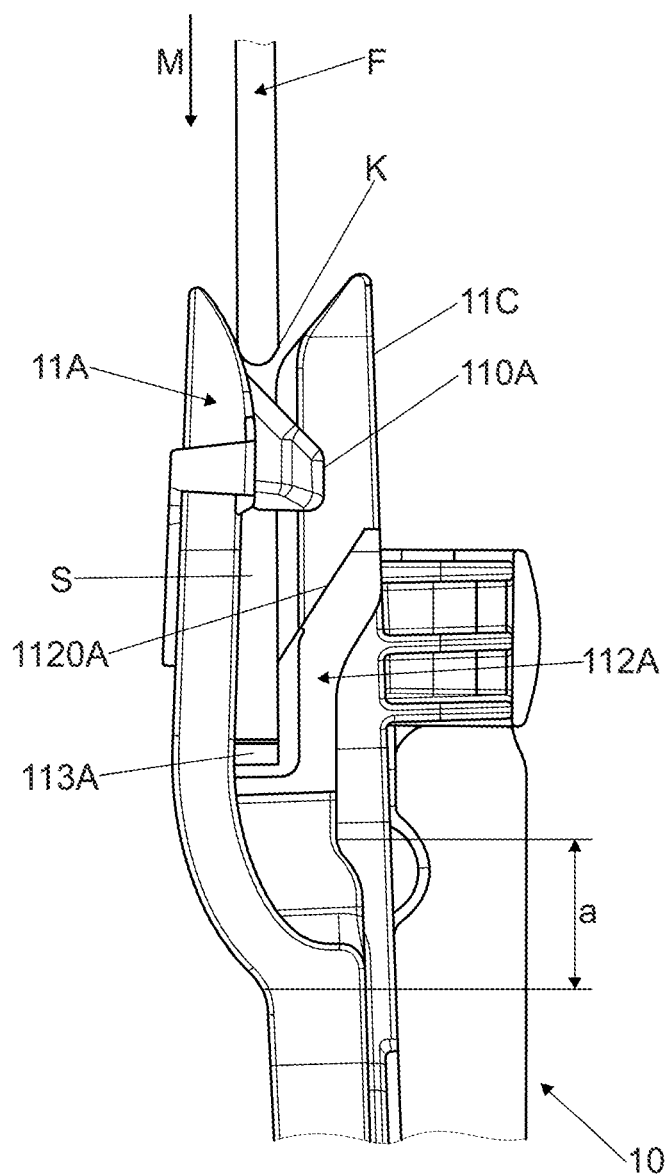
FIG. 3 shows in a rear view a first phase of a mounting of the window pane onto the driver element.

As is illustrated, in particular, with reference to FIGS. 2 and 4C to 4D, in the present case an elastic displaceability of the arresting hooks 112A and 112B relative to the connecting bars 11A, 11B is permitted. Thus each arresting hook 112A, 112B may be pivoted inwardly by the action of the lower edge K, which is inserted further in the mounting direction M (downwardly) into the connecting gap S, counter to the connecting bars 11A and 11B and relative to the connecting bars 11A and 11B in a pivoting direction R2. A pivot axis D2 of the arresting hooks 112A and 112B in this case is spaced apart via the socket sections 114A and 114B from the pivot axis D1 of the connecting bars 11A and 11B by a spacing a.

If the lower edge K slides along the guide surfaces 1120A and 1120B, which run in an inclined manner, of the arresting hooks 112A and 112B into the lowermost region of the connecting gap S between the bearing fingers 111A, 111B and the arresting hooks 112A and 112B, the arresting hooks 112A and 112B pivot back. As soon as the window pane F has also been inserted sufficiently far into the connecting gap S that the latching lugs 110A and 110B are able to snap into the connecting openings of the window pane F, the connecting bars 11A, 11B also pivot back toward the arresting hooks 112, 112B.

The arresting hooks 112A and 112B on the base 113A and 113B, which is partially located by the socket sections 114A and 114B in the recess OA and OB of the connecting bars 11A and 11B, ensure a stabilizing of the window pane F transversely to the mounting direction M when mounted. Via the guide surfaces 1120A and 1120B the lower edge K of the window pane F to be mounted, when this window pane has already been inserted into the connecting gap S of the pane connecting region 11, is guided by elastic displacement of the arresting hooks 112A and 112B into the intended latching position in which the latching hooks 110A and 110B of each connecting bar 11A and 11B are able to snap into the connecting openings of the window pane F. Thus a defined guidance of the window pane F inside the connecting gap S is ensured as far as the latching position. As a result, the mounting of the window pane F on the driver element 1 is facilitated and is less prone to error.

For a defined support of the window pane F, which is mounted as intended on the driver element 1, support sections in the form of thickenings 14A and 14B are provided on each base 113A, 113B. Each of these thickenings 14A and 14B is configured from an elastic soft component which is injection-molded onto the base 113A or 113B, and namely such that the thickening 14A, 14B made of the elastic soft component protrudes at least slightly from the base 113A or 113B. The window pane F which is locally supported by its lower edge K on the thickenings 14A and 14B, therefore, is spaced apart from the remainder of the respective base 113A, 113B via a gap g corresponding to FIG. 2.

By compressing the thickenings 14A and 14B, a displacement of the window pane F relative to the driver element 1 on the pane connecting region 11 is possible. Thus the thickenings 14A and 14B, which are provided eccentrically on the driver element 1, may ensure a defined support of the window pane F on the driver element 1 and, for example when inserting the window pane F into an upper end position, may permit an at least small displacement of the window pane F relative to the driver element 1. Moreover, by the support on the thickenings 14A and 14B an anti-rattling effect may be achieved and, as a result, reversal noise may be avoided. In particular, the window pane F is supported in a defined manner on the thickenings 14A and 14B and thus permits an improved pane support of the lower edge K of the window pane F on the driver element 1.

A liquid-guiding structure 13 is also formed on the driver element body 10 of the driver element 1, via which any liquid such as for example penetrating water may be discharged in a defined manner from the driver element body 10. In particular, the liquid-guiding structure 13 is configured such that water is conducted obliquely in the direction of an edge 10RA, 10RB of the driver element body 10 and beyond, and namely such that the water, in particular, is conducted away from the traction means 2 and, in particular, a traction means connecting region 12 of the driver element 1 on which a coupling of the cable pull 2 to the driver element 1 is implemented. The liquid-guiding structure 13 of the driver element 1 is also configured such that any liquid is also conducted away from the rail grips 10.1, 10.2 and thus in the intended assembled state of the window lifter assembly FH from a guide rail, on which the driver element 1 is displaceably held.

In the driver element 1 shown in FIGS. 1A to 6C, the liquid-guiding structure 13 comprises a plurality of liquid-guiding elements in the form of drainage channels 130A and 130B; see in particular FIGS. 6A to 6C. These drainage channels 130A and 130B are provided in each case eccentrically below a connecting bar 11A and 11B. In this case, two drainage channels 130A, 130B run at least partially obliquely to the mounting direction M of the window pane F laterally downwardly. Each drainage channel 130A, 130B runs on the inner face 1B of the driver element 1, thus inclined downwardly relative to the mounting direction M of the window pane—and a adjustment direction of the driver element 1 in the intended installed state—so that by the action of gravity liquid present on the driver element body 10 may drain away to the side in a targeted manner via the drainage channels 130A, 130B.

Each drainage channel 130A, 130B extends in this case beyond a (right-hand or left-hand) edge 10RA, 10RB of the driver element body 10 so that at a protruding end of each drainage channel 130A, 130B the liquid may drain away from the driver element body 10. A protruding end of each drainage channel 130A, 130B in this case has an L-shaped cross section and is open toward the outer face 1A of the driver element 1. In this manner, liquid discharged via the drainage channels 130A, 130B, is additionally conducted outwardly and thus, in the intended assembled state of the window lifter assembly FH, away from the further components of the window lifter assembly FH.

For assisting the drainage of liquid via the liquid-guiding structure 13 comprising the drainage channels 130A, 130B, in the intended assembled state of the window lifter assembly FH, for example in an upper end position which corresponds to a closed position of the window pane, the driver element 1 may be present inclined slightly in the direction of the vehicle interior and in the direction of a vehicle rear end.

For the targeted discharge of liquid from the driver element body 10, alternatively or additionally to the drainage channels 130A, 130B the liquid-guiding structure 13 may also have liquid-guiding elements which are formed by ribs and/or recesses on the driver element body 10.

Figure 5:
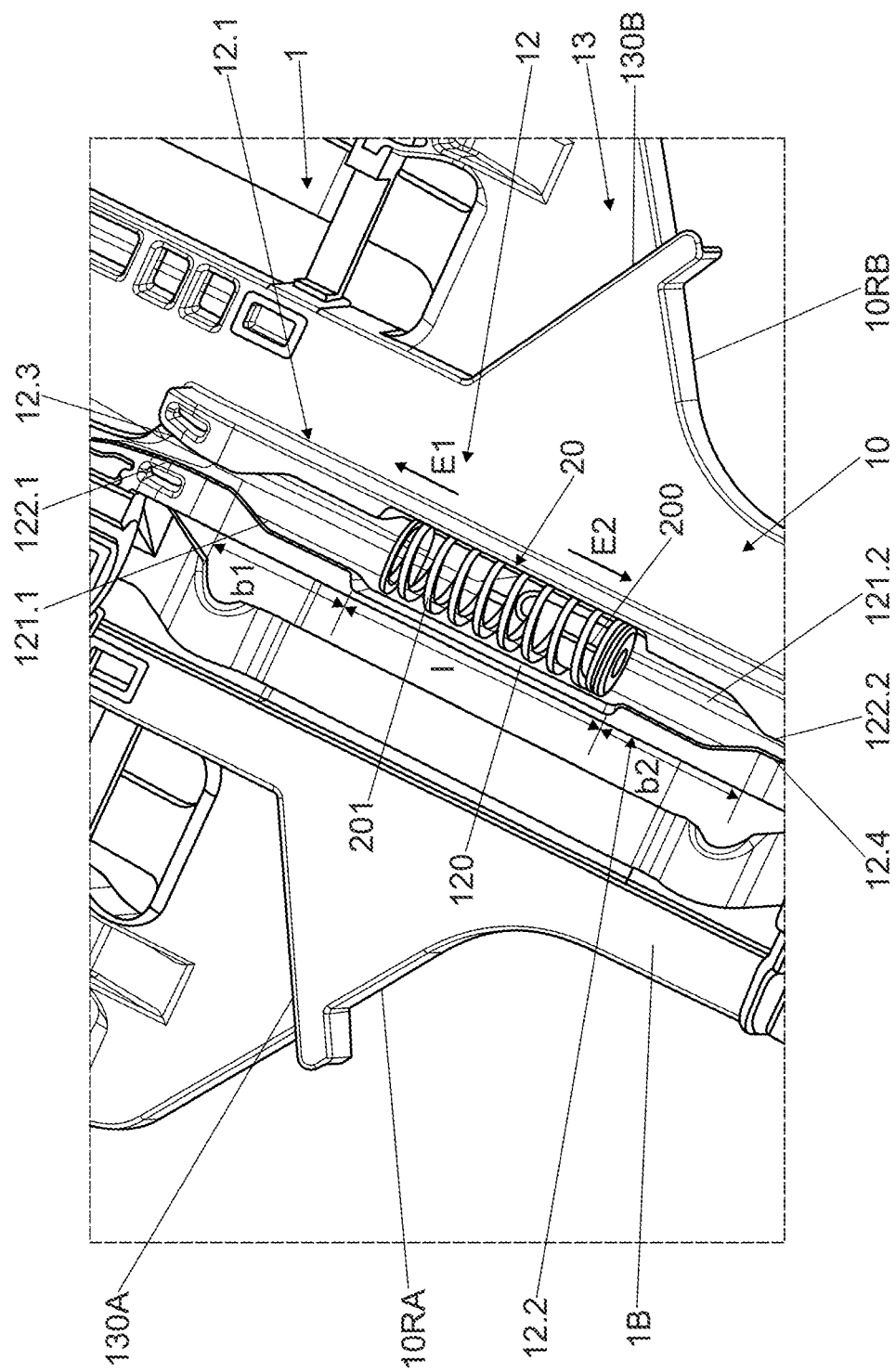
FIG. 5 shows in enlarged scale the driver element of FIGS. 1A and 1B with a view of a traction means connecting region of the driver element.

As is visible, in particular, in the enlarged detailed view of FIG. 5, the driver element 1 has a traction means connecting region 12 for coupling the driver element 1 to the cable pull 2. The traction means connecting region 12 arranged centrally on the driver element body 10 has two nipple chambers 12.1 and 12.2 in succession in a longitudinal direction E1 into which in each case a cable pull end section 20 of the cable pull 1 may be positively inserted in order to transmit thereby an adjustment force for lifting or lowering the window pane F to the driver element 1.

For inserting a cable end section 20 of the cable pull 2 on the traction means connecting region 12 an individual mounting opening 120 located between the two nipple chambers 12.1, 12.2 is provided. Via the one mounting opening 120, therefore, a cable end section 20 may be inserted in the longitudinal direction E1 into the one (upper) nipple chamber 12.1 and—subsequently—a further cable end section (not shown in FIG. 5) in an opposing longitudinal or insertion direction E2 into the other (lower) nipple chamber 12.2. In the present case, a cable end section 20 has in a manner known per se a cable nipple 200 as well as a spring element supported thereon in the form of a compression spring 201 for cable length compensation.

During the mounting of the cable pull 2 via the cable pull end sections 20 on the driver element 1, in principle there is the difficulty that generally the compression spring 201 has to be compressed with a large application of force, in order to permit an insertion into the respectively assigned nipple chamber 12.1 or 12.2. Accordingly, in the case of the driver element 1 shown, an insertion of two cable pull end sections 20 is possible in succession via the mounting opening 120, without the application of manual force and, in particular, without the compression of the compression springs 201.

Thus, in the exemplary embodiment shown, the mounting opening 120 has a length 1 in the longitudinal direction E1 which corresponds at least to the sum of the lengths b1 and b2 of the adjacent nipple chambers 12.1 and 12.2. Accordingly, a cable nipple 200 may be inserted with the uncompressed compression spring 201 into the mounting opening 120 and subsequently pushed or pulled into the associated nipple chamber 12.1 12.2 in the longitudinal direction or insertion direction E1 or E2. The space subsequently available via the mounting opening 120 is thus also sufficient in order to insert the other cable nipple 200 with its compression spring 201, with the uncompressed compression spring 201, and to push or to pull the cable nipple into the opposing nipple chamber 12.2 or 12.1.

For facilitating the greasing of a nipple chamber 12.1, 12.2 the traction means connecting region 12 has a greasing opening 121.1 or 121.2 on each nipple chamber 12.1, 12.2. This greasing opening 121.1, 121.2 in each case adjoins the central mounting opening 120 (upwardly or downwardly) and is provided between the mounting opening 120 and a traction means opening 122.1 or 122.2 of a cable guide channel 12.3, 12.4, via which the cable pull 2 which is connected as intended to the driver element 1 extends away from the respective nipple chamber 12.1 or 12.2. In this case, each greasing opening 121.1 or 121.2 has a width which is smaller than the width of the central mounting opening 120 in order to hold the cable nipple 200 which is inserted with the compression spring 201 in the nipple chamber 12.1 or 12.2. At the same time, however, the width of the greasing opening 121.1 or 121.2 is larger by a multiple than the width of the cable pull opening 122.1, 122.2 via which, during mounting, the cable pull 2 is inserted into the respective cable guide channel 12.3 or 12.4. The dimensions of the greasing opening 121.1 or 121.2 are selected, for example, such that a greasing of the respective nipple chamber 12.1 or 12.2, for example with nepheline, is possible from the outside.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1 Driver element
Driver element body
10.1, 10.2 Rail grip
10RA, 10RB Edge
11 Pane connecting region
110A, 110B Latching lug
111A, 111B Bearing finger (bearing section)
1120A, 1120B Guide surface
112A, 112B Arresting hook (positioning section)
113A, 113B Base
114A, 114B Socket section
11A, 11B Connecting bar
11C Bearing projection (bearing section)
11KA, 11 KB Top section
12 Traction means connecting region
12.1, 12.2 Nipple chamber
12.3, 12.4 Cable guide channel
120 (Central) mounting opening
121.1, 121.2 Greasing opening
122.1, 122.2 Traction means opening
13 Liquid-guiding structure
130A, 130B Drainage channel (liquid-guiding element)
14A, 14B Thickening (support section)
1A, 1B Outer face/inner face
2 Cable pull (traction means)
Cable pull end section
200 Cable nipple
201 Compression spring (spring element)
3 Cable drum
A Drive
a Spacing
AM Motor
b1, b2 Length
D1, D2 Pivot axis
E1, E2 Insertion direction/longitudinal direction
F Window pane
FH Window lifter assembly
G Gap
G1, G2 Pane guide
K Pane lower edge
L Length
M Mounting direction
OA, OB Recess
R1, R2 Pivoting direction
S Connecting gap
T Support component
U1, U2 Deflection element While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A driver element for a use in motor vehicle window lifter configured to adjust a window pane, the driver element comprising:
   a driver element body including:
   a pane connecting region configured to be secured to the window pane and defining a connecting gap configured to receive the window pane, wherein the pane connecting region includes,
   a base, wherein when the window pane is in a connected state, a lower edge of the window pane opposes the base,
   a connecting bar provided on the driver element body and including a latching lug disposed thereon,
   wherein the connecting bar is configured to elastically displace with respect to the driver element body as the window pane is inserted along a mounting direction into the driver element body,
   wherein the latching lug opposes a positioning section, protruding from the base, and is configured to engage a connecting opening defined by the window pane,
   wherein the positioning section opposes the connecting bar and forms a guide surface, wherein the guide surface is inclined with respect to the mounting direction and guides the lower edge as the window pane is inserted into the connecting gap and wherein the positioning section is configured to displace elastically as the window pane is mounted to the driver element, and
   wherein the connecting bar is configured to elastically pivot about a first pivot axis and the positioning section is held by the base so that the positioning section is configured to elastically pivot about a second pivot axis, wherein the second pivot axis is spaced apart from the first pivot axis.

2. The driver element of claim 1, wherein the positioning section is configured to displace elastically as the window pane is mounted to the driver element.

3. The driver element of claim 1, wherein the connecting bar is U-shaped and includes two arms and a top section, wherein the two arms and the top section define a recess.

4. The driver element of claim 3, wherein the positioning section opposes the recess.

5. The driver element of claim 3, wherein the base is formed by a socket section protruding from the driver element body towards the top section.

6. The driver element of claim 5, wherein the socket section at least partially extends into the recess.

7. The driver element of claim 1, wherein the positioning section of the pane connecting region is pin-shaped.

8. The driver element of claim 1, wherein two opposing sides of the connecting gap are formed by the connecting bar and a bearing section protruding from the driver element body.

9. The driver element of claim 1, wherein the pane connection region includes another connecting bar.

10. The driver element of claim 9, wherein the pane connection region includes a bearing section protruding from the driver element body and disposed between the connecting bar and the other connecting bar.

11. The driver element of claim 1, wherein the pane connection region includes at least one support section protruding from the base and formed of an elastic material and configured to support the lower edge of the window pane.

12. The driver element of claim 11, wherein the at least one support section is formed by a localized protruding and thickening of an elastic component protruding from the base.

13. The driver element of claim 1, further comprising:
a liquid-guiding element configured to discharge liquid from the driver element body.

14. The driver element of claim 13, wherein the liquid-guiding element is formed by at least one of a rib, a recess, and a channel.

* * * * *